(12) United States Patent
Cragun et al.

(10) Patent No.: US 7,194,693 B2
(45) Date of Patent: Mar. 20, 2007

(54) APPARATUS AND METHOD FOR AUTOMATICALLY HIGHLIGHTING TEXT IN AN ELECTRONIC DOCUMENT

(75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/282,567

(22) Filed: Oct. 29, 2002

(65) Prior Publication Data

US 2004/0080532 A1    Apr. 29, 2004

(51) Int. Cl.
*G06F 3/00* (2006.01)

(52) U.S. Cl. ..................................... 715/747
(58) Field of Classification Search ................. 715/747
See application file for complete search history.

(56) References Cited

U.S. PATENT DOCUMENTS

| | | | | |
|---|---|---|---|---|
| 5,363,481 | A * | 11/1994 | Tilt | 715/814 |
| 6,026,409 | A * | 2/2000 | Blumenthal | 707/104.1 |
| 6,075,537 | A * | 6/2000 | Adapathya et al. | 715/760 |
| 6,332,148 | B1 | 12/2001 | Paine et al. | |
| 6,968,332 | B1 * | 11/2005 | Milic-Frayling et al. | 707/3 |
| 2003/0051214 | A1 * | 3/2003 | Graham et al. | 715/512 |

OTHER PUBLICATIONS

Screen Dumps of East (pp. 1-13, 1999).*

* cited by examiner

*Primary Examiner*—Kristine Kincaid
*Assistant Examiner*—Lê Nguyen
(74) *Attorney, Agent, or Firm*—Martin & Associates, LLC; Derek P. Martin

(57) ABSTRACT

An apparatus and method helps a user to determine parts of an electronic document that are of interest by allowing the user to define preferences for processing an electronic document, and by automatically highlighting one or more portions of the document according to the user preferences. Highlighting includes any way to enhance or alter the appearance of text, including bold, italics, underlining, change in font style, change in font size, change in color, change in background color, etc. The automatic highlighting of portions of the document attract the user's eyes to that portion of the document, which helps the user to discern whether or not the highlighted portion is relevant or interesting. The preferred embodiments also include a document generator that takes an input document and generates therefrom an output document that has one or more highlighted portions that are hard-coded into the document according to the user preferences. The preferred embodiments further include the ability to automatically enable or disable the highlighting of a document according to characteristics of the electronic document, or the user's actions (such as the speed of scrolling through a document). In addition, the preferred embodiments include markup language tags that allow an author of a document to define portions of interest that may be highlighted when highlighting is enabled.

39 Claims, 10 Drawing Sheets

Overview

Background

In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 9

Overview

Background

In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 10

Overview

Background

In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 11

Overview

Background

In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 12

Overview

Background
In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 13

Overview

Background
In 1992 IBM was a $64.8 billion company, of which less than $6 billion was derived from non-maintenance services. Ten short years later, the business of information technology (IT) services alone generated more than 40 percent of IBM's $86 billion in sales and had become the single largest source of revenue in IBM's portfolio.

How did that happen? It was partly the result of old-fashioned hard work and serious commitment: growing customer by customer; building disciplined management and financial systems; and investing to hire and train experts in everything from IT consulting to systems architecture and Web services. IBM used its financial strength to fund the expensive push into outsourcing, and the ocmpany placed informed bets on the future in areas such as IT utility services ("e-business on demand") and hosted storage.

But most important, the success of IBM Global Services came from something very simple: a clear understanding of customer's needs. IBM saw that technology and business were converging to create something new and challenging for every kind of enterprise. And IBM had the deep experience in both areas to help its customers bring them together most effectively.

The following pages offer a brief look at the history and growth of the organization that is today IBM's top revenue generator.

FIG. 14

| Attribute | HTML Tags |
|---|---|
| Font Color | <CA_FONT COLOR="#RRGGBB"> |
| | <CA_FONT COLOR="colorname"> |
| Font Size | <CA_FONT SIZE=number> |
| Font Face | <CA_FONT FACE="facename1, facename2..."> |
| Opinion | <CA_OPINION><br></CA_OPINION> |
| Summary | <CA_SUMMARY><br></CA_SUMMARY> |
| Conclusion | <CA_CONCLUSION><br></CA_CONCLUSION> |
| Counterpoint | <CA_COUNTER-POINT><br></CA_COUNTER-POINT> |
| Image | <CA_IMAGE INCLUDE><br></CA_IMAGE INCLUDE> |
| | <CA_IMAGE EXCLUDE><br></CA_IMAGE EXCLUDE> |

FIG. 15

APPARATUS AND METHOD FOR AUTOMATICALLY HIGHLIGHTING TEXT IN AN ELECTRONIC DOCUMENT

BACKGROUND OF THE INVENTION

1. Technical Field

This invention generally relates to computer systems, and more specifically relates to apparatus and methods for reading electronic documents.

2. Background Art

Since the dawn of the computer age, computers have evolved and become more and more powerful. In our present day, computers have become indispensable in many fields of human endeavor including engineering design, machine and process control, information storage and retrieval, and office computing. One common use for computers is to allow a user to read electronic documents.

Many people have developed their own reading techniques for reading large documents. For example, some people may train themselves to scan the first sentence of paragraphs and, if the content is not interesting in the first sentence, to jump to the next paragraph. These techniques are useful, but are limited to human skills and training, and are better suited to reading hard print rather than electronic documents.

The prior art offers no assistance for a reader to more quickly comprehend a large electronic document. Without a way for a computer system to help a user to more easily comprehend electronic documents, users will be forced to use manual methods to determine the relevant contents of an electronic document.

DISCLOSURE OF INVENTION

According to the preferred embodiments, an apparatus and method helps a user to determine parts of an electronic document that are of interest by allowing the user to define preferences for processing an electronic document, and by automatically highlighting one or more portions of the document according to the user preferences. Highlighting includes any way to enhance or alter the appearance of text, including bold, italics, underlining, change in font style, change in font size, change in color, change in background color, etc. The automatic highlighting of portions of the document attract the user's eyes to that portion of the document, which helps the user to discern whether or not the highlighted portion is relevant or interesting. The preferred embodiments also include a document generator that takes an input document and generates therefrom an output document that has one or more highlighted portions that are hard-coded into the document according to the user preferences. The preferred embodiments further include the ability to automatically enable or disable the highlighting of a document according to characteristics of the electronic document, or the user's actions (such as the speed of scrolling through a document). In addition, the preferred embodiments include markup language tags that allow an author of a document to define portions of interest that may be highlighted when highlighting is enabled.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 9 is a portion of a sample document that is used to illustrate the automatic highlighting of the preferred embodiments;

FIG. 10 is the document portion of FIG. 9 after automatically highlighting the first sentence of each paragraph in accordance with the preferred embodiments;

FIG. 11 is the document portion of FIG. 9 after automatically highlighting terms included in the summaries list in FIG. 8;

FIG. 12 is the document portion of FIG. 9 after automatically highlighting a sentence that includes a question mark as specified in the key points list in FIG. 8;

FIG. 13 is the document portion of FIG. 9 after automatically highlighting a sentence that includes an item selected in the strong emphasis list of FIG. 8;

FIG. 14 is the document portion of FIG. 9 after automatically highlighting the sentences that include selected items in FIGS. 11–13; and FIG. 15 is a table of markup language tags in accordance with the preferred embodiment that may be used in a document to enable automatic highlighting of a document.

BEST MODE FOR CARRYING OUT THE INVENTION

The preferred embodiments automatically highlight an electronic document in a way that aids a human reader in quickly comprehending what is in the document. The highlighting is performed according to user preferences, which may default to some preset set of values and parameters, but which also allow a user to customize the settings according to particular needs. Once a user has set preferences for automatic highlighting, these preferences cause selective highlighting of text in the document. Highlighting can include any suitable way to accentuate the appearance of text, including a change in font type, font size, font color, background color, bold, italics, underline, double underline, etc. The preferred embodiments also include a mechanism that allows for automatically turning the highlighting on and off according to actions the user takes when browsing a document.

Figure 1:
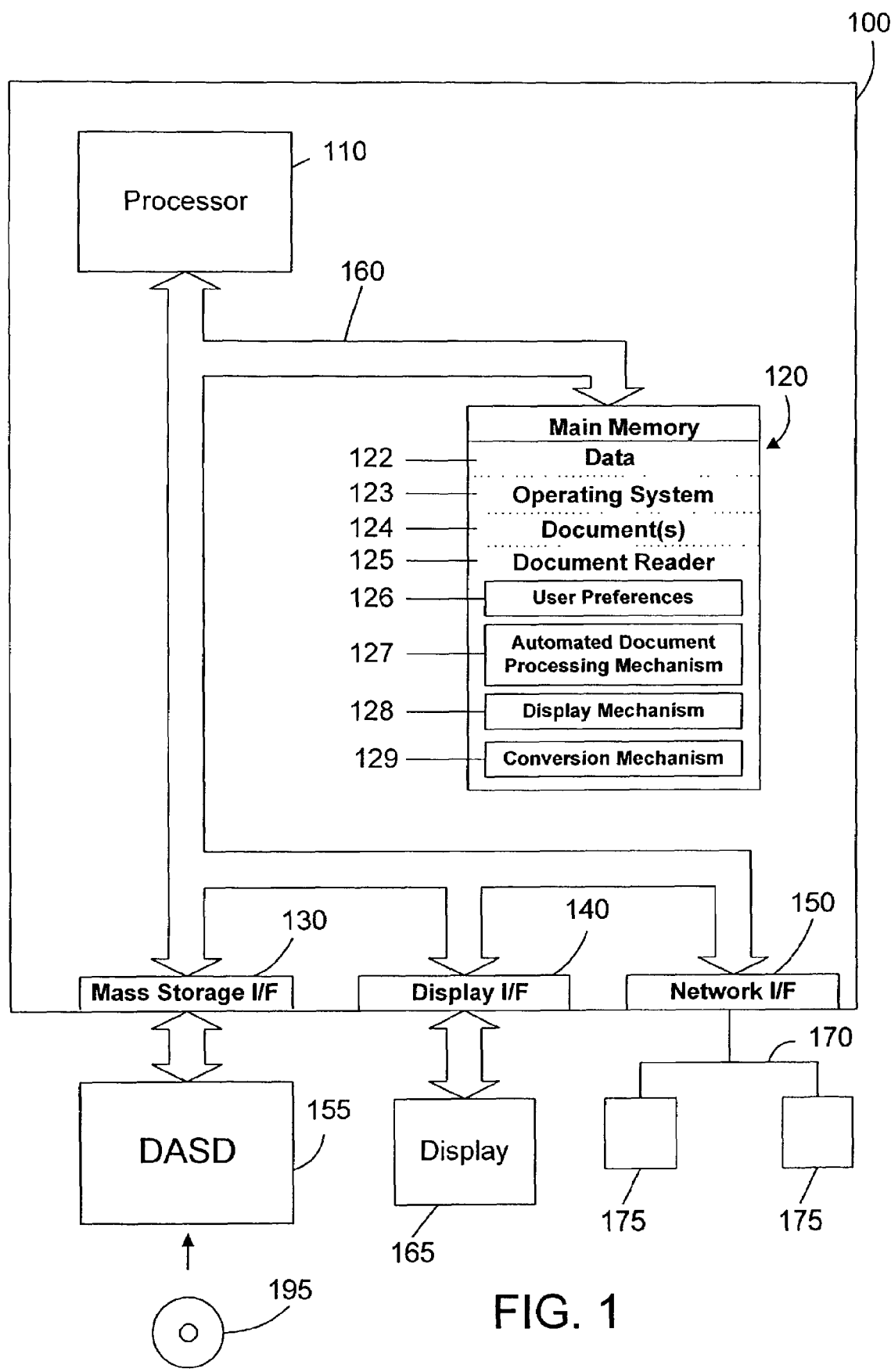
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 122, an operating system 123, one or more electronic documents 124, and document reader 125. Document reader 125 preferably includes user preferences 126, automated document processing mechanism 127, display mechanism 128, and conversion mechanism 129. User preferences 126 are values and parameters that govern which text is highlighted and how the highlighting is performed. Automated document processing mechanism 127 reads an electronic document 124, reads the user preferences 126, highlights the electronic document 124 according to the user preferences 126, and either displays the highlighted document using display mechanism 128 or generates a new hard-coded highlighted document using conversion mechanism 129. Note that document reader 125 preferably includes both a display mechanism 128 and a conversion mechanism 129, but the preferred embodiments extend to any document reader that has one or more of the display mechanism 128 and the conversion mechanism 129.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, document(s) 124, and document reader 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Document(s) 124 represent one or more documents in electronic form that may be read by a human user with the aid of a suitable apparatus, such as computer system 100. Documents 124 include documents in a proprietary file format, such as Microsoft Word or Lotus Notes, as well as documents that are in a more universal format, such as hypertext markup language (HTML). Document reader 125 is used to process an existing document 124 to selectively highlight one or more portions of text in the document 124 to generate therefrom a highlighted document. The highlighted document may then be displayed to a user to help the user to more quickly comprehend the significance of the processed document. Document reader 125 may be a word processor, a web browser, a graphics program, or any other software application or program that allows displaying a text document.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 195 of FIG. 1), and transmission type media such as digital and analog communications links.

Figure 2:
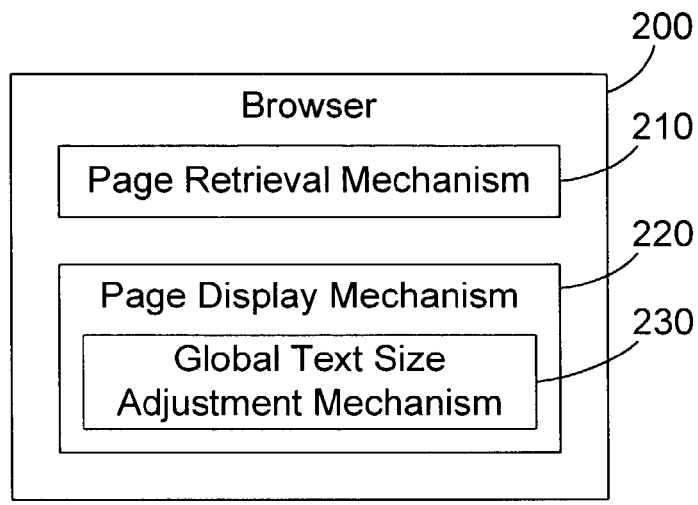
FIG. 2 is a block diagram of a prior art browser.

Referring to FIG. 2, the prior art includes web browsers 200 that allow a user to view electronic documents. Browser 200 includes a page retrieval mechanism 210 and a page display mechanism 220. The page retrieval mechanism 210 is used to invoke a page of an electronic document. The page display mechanism of known browsers (such as Microsoft Internet Explorer and Netscape Communicator) include a global text size adjustment mechanism 230 that allows the user to specify a size for all text in the document. This feature is useful in allowing a user to globally change the size of displayed text in the entire document, and is especially useful to condense more text on a page, or to enlarge the text for those who have poor eyesight that causes difficulty in reading the normal-sized text. Note, however, that the global text size adjustment mechanism 230 is a manual adjustment that the user may make, if desired, by manually selecting a different font size from a menu. In addition, the global text size adjustment mechanism 230 operates on all of the text in the document. The prior art as shown in simplified form in FIG. 2 thus suffers from two major deficiencies: 1) the text size adjustment must be performed manually by the user, and 2) the text size adjustment applies to all text in the document. These deficiencies are overcome by the preferred embodiments, as described in detail herein.

Figure 3:
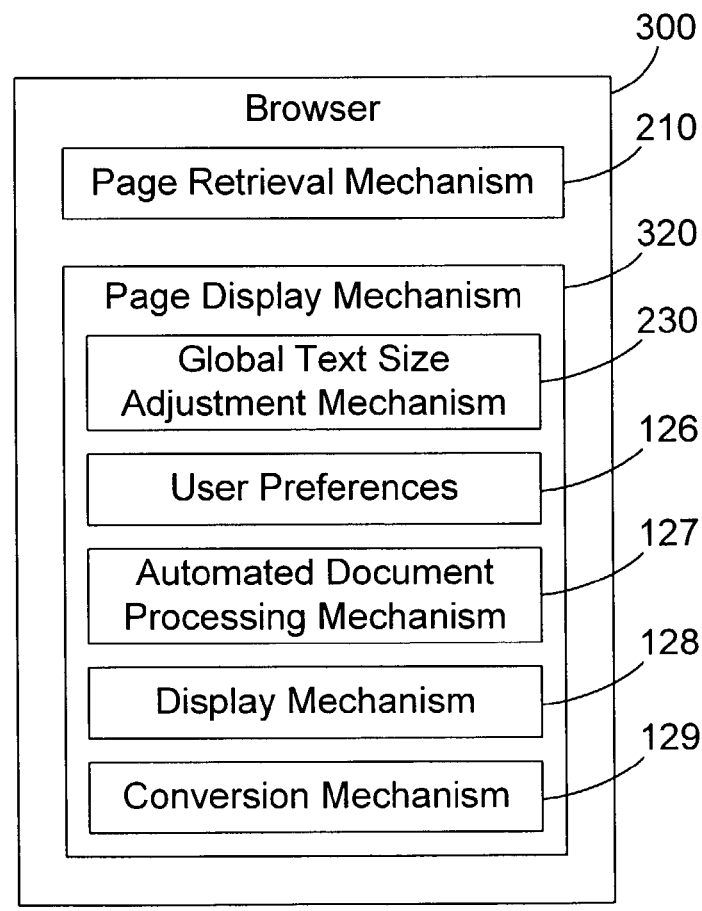
FIG. 3 is a block diagram of a browser in accordance with the preferred embodiments.

Referring now to FIG. 3, a web browser 300 is one specific example of a suitable document reader 125 in FIG. 1. Browser 300 includes a page retrieval mechanism 210, which is preferably the same as in prior art browser 200 of FIG. 2. Browser 300 also includes a page display mechanism 320 of the preferred embodiments that preferably includes the same global text size adjustment mechanism 230 that exists in the prior art (as shown in FIG. 2), but that also includes user preferences 126, automated document processing mechanism 127, display mechanism 128, and conversion mechanism 129. Browser 300 thus can perform the global text size adjustment using mechanism 230, the same as is done in the prior art, but can additionally perform automatic highlighting of electronic documents by automated document processing mechanism 127 according to user preferences 126, and can then either display the highlighted document using display mechanism 128, or can generate a new document with the highlighted portions hard-coded in the document using conversion mechanism 129. By allowing dynamic highlighting of text according to user preferences, the page display mechanism 320 provides automatic assistance to the reader in the form of highlights that help the reader to more quickly comprehend the significance of text in the document.

Figure 4:
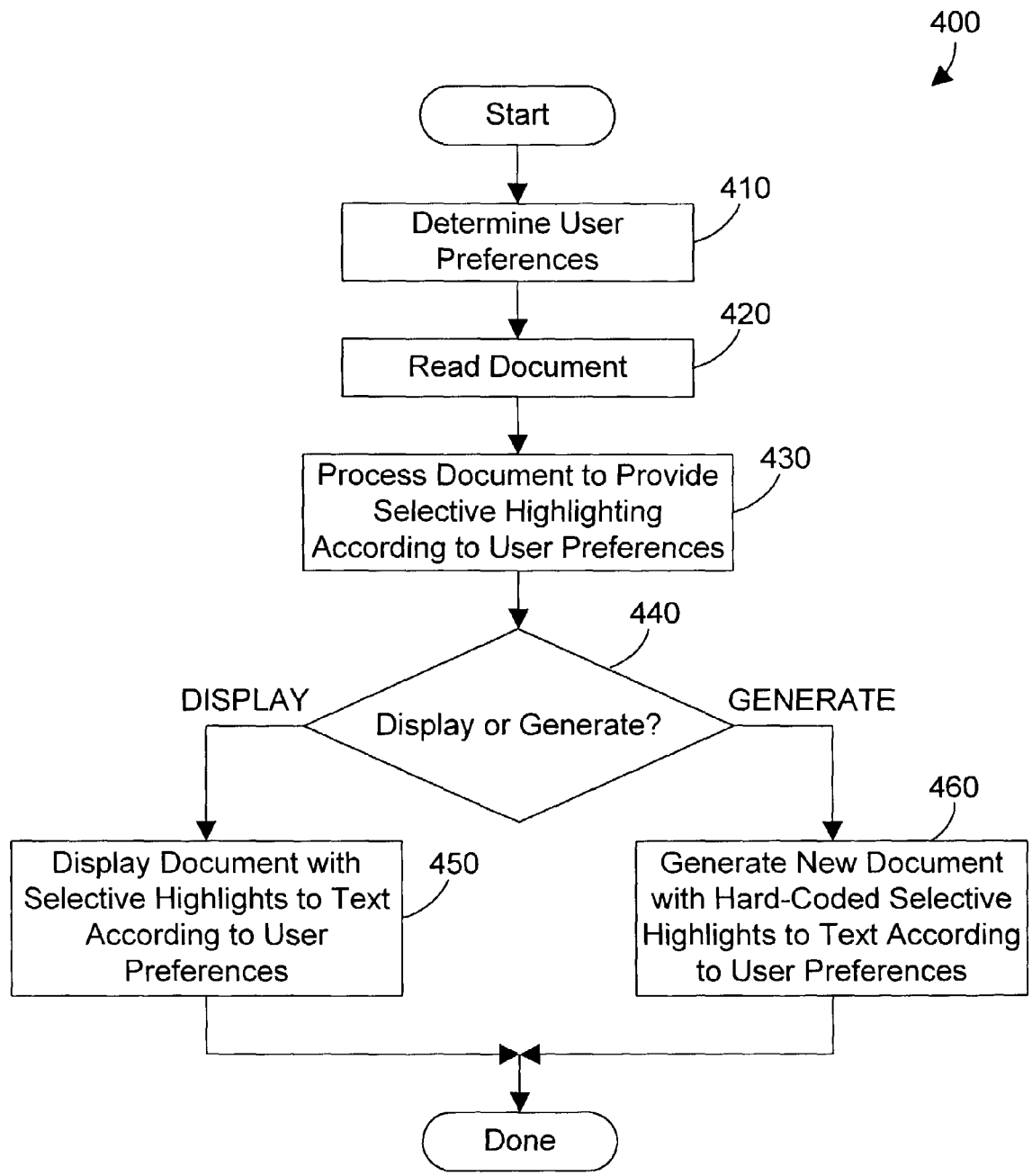
FIG. 4 is a flow diagram of a method for highlighting a document in accordance with the preferred embodiments.

Referring to FIG. 4, a method 400 in accordance with the preferred embodiments begins by determining user preferences (step 410). This step may be performed by either reading a set of previously-defined user preferences, or by prompting the user to select preferences for highlighting a document. Note that a combination of these two options is possible, where a set of pre-packaged user preferences are defined, and the user is prompted to select or deselect among the pre-packaged preferences, or to add custom preferences to the pre-packaged preferences. The document is read (step 420). Next, the automatic document processing mechanism processes the document to provide appropriate selective highlighting of text in the document according to the defined user preferences (step 430). At this point, the automatic document processing mechanism determines whether the highlighted document needs to be displayed or generated (step 440). If the highlighted document is to be displayed, it is displayed with the highlights to text according to the user preferences (step 450). If the highlighted document is to be generated into a new document, a new document is generated with hard-coded selective highlights to text according to the user preferences (step 460). Note that in step 450, the document is not itself changed, but the display of the document is changed to selectively highlight one or more portions of text in the document to help a human reader to more easily comprehend the document. In step 460, in contrast, a new document is generated that may be stored with the hard-coded selective highlights. Because the highlights are hard-coded into the new document, the new document may be displayed on any suitable system. In other words, the new document could be sent to another user that does not have a document reader 125 that includes an automated document processing mechanism 127, and the other user could still view the highlighted document using a traditional browser because the highlights are hard-coded into the markup language that defines the document. In addition, the new document that includes the highlights may be printed out in hard-copy form with the highlights. This would allow a teacher, for example, to specify user preferences for highlighting that would help the students to more readily comprehend a document in either hard copy or electronic form.

One possible use for generating new documents with hard-coded selective highlights is to compare the effectiveness of different user preferences on user comprehension. Researchers could define different sets of user preferences, and generate a new highlighted document that corresponds to each set. Human users could then read the different documents, and provide feedback regarding whether one document is more easily understandable than the same document with different highlights. The preferred embodiments extend to any generation or display of a selectively highlighted document that is generated from processing an existing document according to user preferences.

Figure 5:
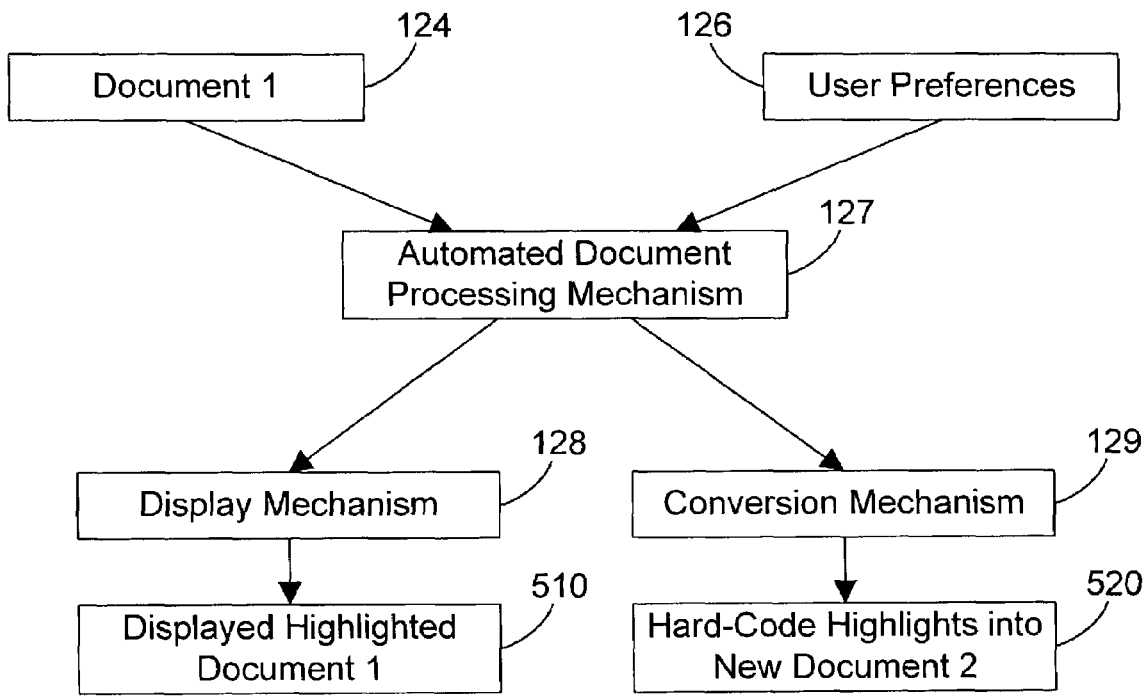
FIG. 5 is a block diagram showing the processing of a document in accordance with the preferred embodiments.

FIG. 5 represents how a document 124 may be processed by the automated document processing mechanism 127 according to user preferences 126. As shown in FIG. 4, the automated document processing mechanism 127 reads the document 124 and reads the user preferences 126. If the highlighted document is to be displayed, it is sent to the display mechanism 128, which displays the highlighted document to a user (step 510). If the highlighted document is to be converted to a new document that includes hard-coded highlights, the highlighted document is sent to the conversion mechanism 129, which generates from the highlighted document a new document that includes the hard-coded highlights (step 520). One way for hard-coding highlights into an HTML document is to add HTML tags that provide the desired highlights (bold, font size, etc.) in the document so that any person with a browser can view the document with the hard-coded highlights. Note that the document reader shown in FIG. 5 includes both a display mechanism 128 and a conversion mechanism 129, but it is equally within the scope of the preferred embodiments for a document reader to include only one of these mechanisms.

Figure 6:
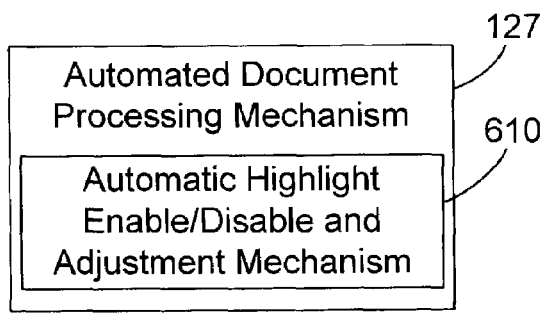
FIG. 6 is a block diagram showing an automatic highlight enable/disable mechanism that is within the scope of the preferred embodiments.

One significant advantage of the preferred embodiments is that the automatic highlighting of documents may be automatically turned on or off according to the user's actions in reading a document. Thus, as shown in FIG. 6, the automated document processing mechanism 127 may include an automatic highlight enable/disable and adjustment mechanism 610 that can automatically turn highlighting on or off or adjust the manner of highlighting depending on external factors, such as the characteristics of the electronic document or the user's actions in viewing the document. For example, if a document includes lots of formatting, such as headers, bold, underline, different colors of text, etc., the effectiveness of the highlighting for assisting comprehension of a reader will be reduced. In this case, the automatic highlight enable/disable and adjustment mechanism 610 could decide to perform a different type of highlighting than specified by the user, could decide to exclude some or all of the highlights. For a document that has little formatting, the automatic highlight enable/disable mechanism could enable all user-specified highlights.

In another example, the automatic highlight enable/disable and adjustment mechanism 610 changes how a document is highlighted based on actions of a user in viewing the document. if the user is scrolling very quickly through a document, the automatic highlighting of the document could be turned off. If the scrolling continues but slows down to a speed where the user can scan text as he or she scrolls, some limited highlighting could be enabled. And once the scrolling slows significantly or stops, indicating that the user is reading text on the screen, the full automatic highlighting could be enabled. This example is shown in the form of a flow diagram in FIG. 7.

Figure 7:
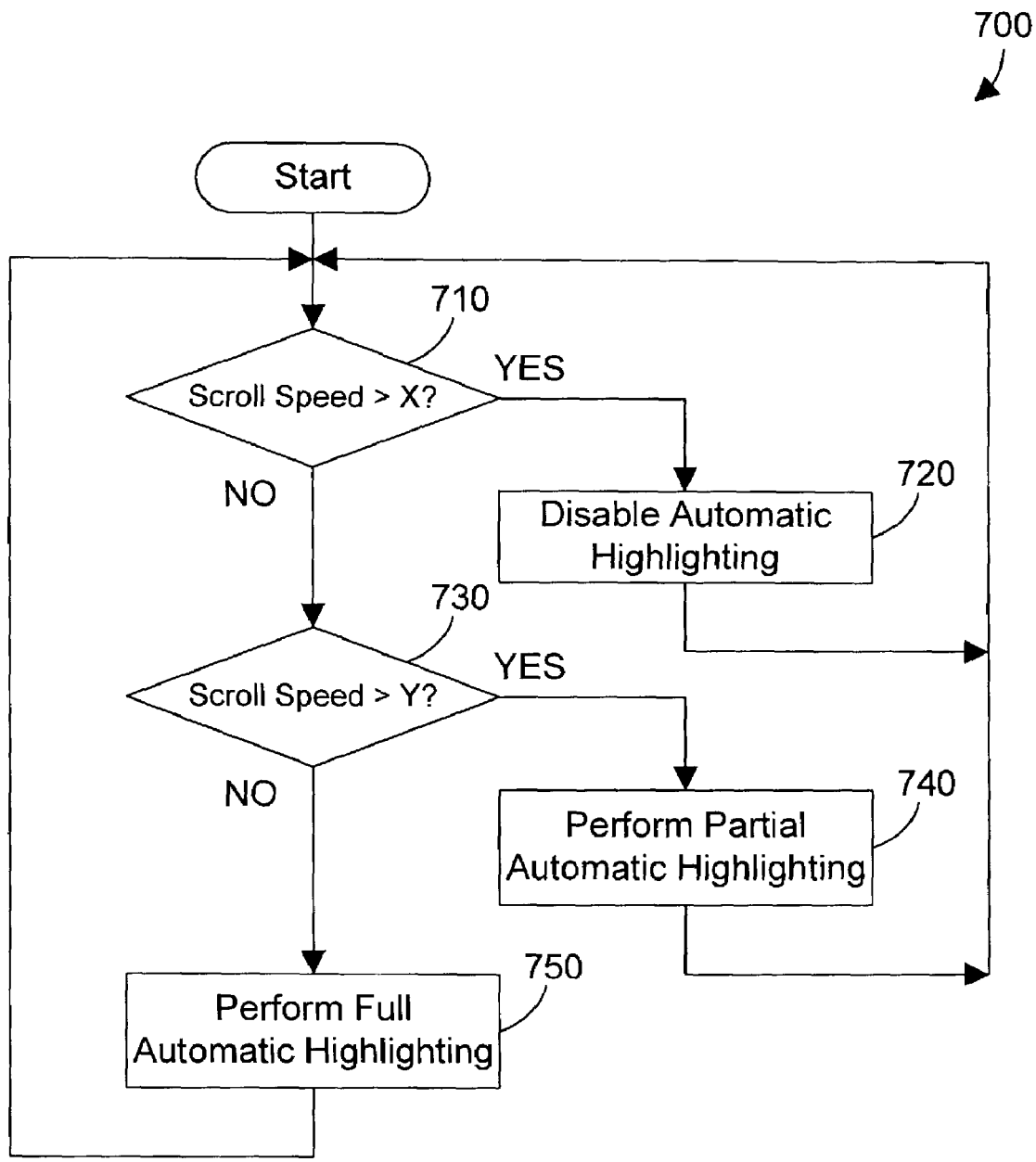
FIG. 7 is a flow diagram of a sample method for automatically enabling and disabling automatic highlighting according to a user's speed of scrolling up or down a document.

In method 700 of FIG. 7, if the user's scroll speed is higher than some upper threshold value X (step 710=YES), automatic highlighting is disabled (step 720). If the user's scroll speed is not greater than the upper threshold value X (step 710=NO), but is greater than some lower threshold value Y (step 730=YES), partial automatic highlighting may be performed (step 740). One example of partial automatic highlighting is to highlight only the first sentence of each paragraph. If the user's scroll speed is not greater than the upper threshold value X (step 710=NO) and is not greater than the lower threshold value Y (step 730=NO), full automatic highlighting is performed. Note that the user preferences could specify what actions to be performed for partial automatic highlighting in step 740 and full automatic highlighting in step 750.

Method 700 of FIG. 7 is shown as one possible way to automatically alter the automatic highlighting depending on the user's actions in browsing a document. The preferred embodiments expressly extend to any suitable heuristic for enabling, disabling, or changing the automatic highlighting according to characteristics of the document or the user's actions in viewing the document. Another example is provided to illustrate. If the scroll rate is higher than the upper threshold value X, only the specified words are highlighted by putting them in extra large font so they are easy to see when scrolling quickly through a document. Slowing down the scroll rate results in removing the extra large font highlight, and instead highlighting the entire sentence according to the user-selected highlight type. Slowing down further until the scroll rate falls below the lower threshold value Y results in enabling full highlighting. In addition, a timer could be used to disable the automatic highlighting once a user stops scrolling altogether if automatic highlighting is only desired when scanning (i.e., scrolling).

Figure 8:
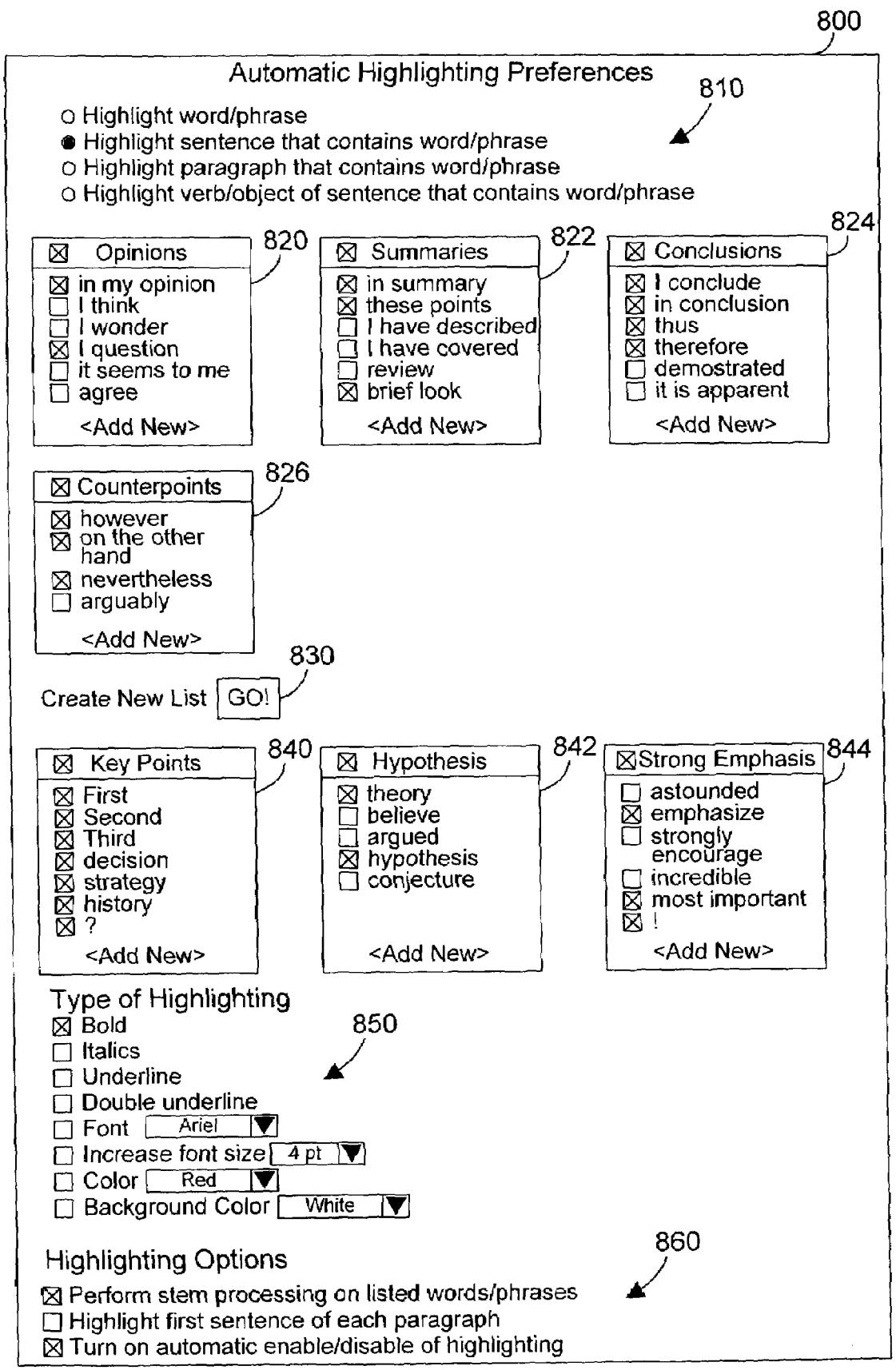
FIG. 8 is a sample display window that shows various preferences that a user may set for automatic highlighting in accordance with the preferred embodiments.

Referring now to FIG. 8, a sample display window 800 is shown that allows a user to set preferences for automatic highlighting of documents. A menu 810 includes four selections for highlighting text about a selected word or phrase. The word/phrase itself could be highlighted. In the alternative, the sentence or paragraph that contains the word/phrase could be highlighted. Another alternative is to highlight the verb and object of the sentence that contains the word/phrase. While the first three listed options result in highlighting the word/phrase itself, the fourth results in highlighting text other than the word/phrase, but that corresponds to the word/phrase. For this reason, the apparatus and methods of the preferred embodiments read the user preferences, which may contain one or more words that trigger the highlighting of one or more corresponding portions of the document. Of course, other options for highlighting could also be specified, and are within the scope of the preferred embodiments. In the specific example of FIG. 8, the options in menu 810 are mutually exclusive, but in other implementations, more than one of these options could be selected, with each option having a different form of highlighting. For example, if both highlight word/phrase and highlight sentence that contains word/phrase are both selected, the sentence could be bolded while the word/phrase could be underlined or italicized in addition to being bolded.

Next in window 800 we see several tables with lists of defined words and phrases that will trigger automatic highlighting. An opinions table 820 contains the phrases "in my opinion", "I think", "I wonder", "I question", "it seems to me" and the word "agree." Note that each item in the table includes a box that may be checked to include the word/phrase in the user preferences, or may be unchecked to exclude the word/phrase from the user preferences. In similar fashion, a summaries table 822 includes words and phrases that indicate a summary in the text; a conclusions table 824 includes words and phrases that indicate a conclusion in the text; and a counterpoints table 826 includes words and phrases that indicate that a contrary point of view is being expressed. Note that each table preferably includes an <Add New> entry that can be clicked when a user wants to add a word or phrase to the table, and a check box in the title that allows the user to select or de-select the category. In the specific example of FIG. 8, we assume that the opinions table 820, summaries table 822, conclusions table 824, and counterpoints table 826 are all pre-defined user preferences. These could be pre-defined, for example, in a word processor or web browser application that displays text to a user. We also assume that the user preferences allow adding new lists by clicking on the GO! button 830 for creating a new list. In FIG. 8, we assume that a user has created three new tables that contain lists that were not pre-defined, namely the key points table 840, the hypothesis table 842, and the strong emphasis table 844. These tables have the same format as the pre-defined tables, with check boxes to select or deselect defined words/phrases, and an <Add New> link to add a new entry to each table.

Window 800 also includes a "Type of Highlighting" area 850 that allows the user to specify how the selected highlighting will occur. Examples of suitable highlighting shown in FIG. 8 include bold, italics, underline, double underline, font style, an increase in font size, a specification of color for the text, and specification of background color for the text. In the preferred embodiments, these selections are not mutually-exclusive, so highlighting can include any combination of or all of these selections. Note that the "Font" selection includes a drop-down list that allows a user to select a specific font style for highlighted text. Similarly, the "Increase font size" selection includes a drop-down list that allows a user to select how many points to increase the font size for highlighted text, and the color selection includes a drop-down list that allows a user to select a color for highlighted text.

At the bottom of window 800 we see a menu 860 that allows the user to select other highlighting options. For example, a user can select the option that performs stem processing on listed words/phrases. Stem processing is a well-known method in the computer arts for processing words to find their various forms. For example, stem processing for the word "believe" would result in a set of words that includes "belief", "believe", "believed" and "believing." Enabling stem processing allows highlighting similar terms of a selected word or phrase without having to specify each exact form. An expanded form of stem processing could include different forms of a phrase. For example, performing extended stem processing on the phrase "in my opinion" in the opinions table 820 could return the phrases "in my opinion", "in our opinion", "it is my opinion", "it is our opinion", etc. The stem processing shown in FIG. 8 expressly includes the generation of any word or phrase that is automatically added to the selected word/phrases to be highlighted.

Another option in menu 860 is to highlight the first sentence of each paragraph. Yet another option is to turn on or turn off automatic enable/disable of highlighting. This user preference controls the function of the automatic highlight enable/disable and adjustment mechanism 610 shown in FIG. 6. When turned on (i.e., when the corresponding radio button in FIG. 8 is selected, as shown in FIG. 8) the automatic highlight enable/disable mechanism will automatically turn the highlighting of text on and off depending on the user's actions in browsing the text. When turned off (i. e., when the corresponding radio button in FIG. 8 is not selected) the automatic highlight enable/disable mechanism will not automatically turn the highlighting of text on and off.

One skilled in the art will appreciate that the many menu options shown in FIG. 8 for specifying user preferences for performing automatic highlighting are merely exemplary of the almost endless number of possibilities for specifying user preferences for automatic highlighting of text in an electronic document. For example, the user preferences menu could allow the user to select a different highlighting type for each defined category. Thus, opinions could be bolded, conclusions could appear in red text, etc. The preferred embodiments expressly extend to any and all ways of specifying user preferences for performing automatic selective highlighting in an electronic document.

Examples are now presented to illustrate the automatic highlighting of text in an electronic document. FIG. 9 shows four paragraphs of part of an electronic document. The Background heading is a larger font, is bold, and is underlined, but the rest of the text has no features that help the user to comprehend the document. In the prior art, the user would have to manually scan the document in an attempt to find portions of interest. In the preferred embodiments, however, the user can define user preferences, which are then used to process an electronic document and to display one or more highlighted portions according to the user preferences.

In a first example shown in FIG. 10, we assume the user has selected a preference that the first sentence of each paragraph is to be highlighted. We assume for this example that the user has selected "Bold" as the only form of highlighting. As a result, when the document is displayed to the user, the first sentence of each paragraph is put in bold text, thereby allowing the user to more easily scan the contents of the first sentences to see if they indicate interesting material in the paragraph that the reader may want to read further.

In a second example shown in FIG. 11, we assume the user has selected to highlight sentences that contain the selected words/phrases, where the user has selected the "brief look" phrase in the Summaries table 822 of FIG. 8, and the user has selected the type of highlighting in menu 850 to be "Bold". The result is shown in FIG. 1, with the last sentence that contains the term "brief look" being displayed in bold face text.

In a third example shown in FIG. 12, we assume the user has selected to highlight sentences that contain the selected words/phrases, where the user has selected the question mark in the Key Points table 840 of FIG. 8, and the user has selected the type of highlighting in menu 850 to be "Bold". The result is shown in FIG. 12, with the sentence that contains the question mark being displayed in bold face text.

In a fourth example shown in FIG. 13, we assume the user has selected to highlight sentences that contain the selected words/phrases, where the user has selected the phrase "most important" in the Strong Emphasis table 844 of FIG. 8, and the user has selected the type of highlighting in menu 850 to be "Bold". The result is shown in FIG. 13, with the sentence that contains the phrase "most important" being displayed in bold face text.

In a fifth example shown in FIG. 14, we assume the user has selected all of the user preferences for the examples shown in FIGS. 11–13. The result is shown in FIG. 14, with the sentences that contain the selected words/phrases being displayed in bold face text.

The preferred embodiments include the ability for an author to put special tags in a document that can then be used by the automatic document processing mechanism to perform automatic highlighting that will help the reader to comprehend an electronic document. The specific tags shown in FIG. 15 are shown by way of example as suitable tags that could be added to the definition of hypertext markup language (HTML) in order to allow web browsers to support automatic selective highlighting of text in accordance with the preferred embodiments.

Each of the tags in FIG. 15 are shown as examples of suitable markup language tags that could be included in an electronic document to help control how the automatic document processing mechanism performs automatic highlighting. The tags give an author some control concerning which portions of a document will be automatically highlighted when automatic highlighting is enabled. One skilled in the art will recognize that numerous other types of tags could be identified with numerous different formats. The preferred embodiments expressly extends to any form of tag or other identifier in an electronic document that helps the automatic document processing mechanism know how to perform automatic highlighting.

Each of the tags in FIG. 15 are prefaced with "CA_", indicating that these are tags used as a comprehension assist for readers of the document. The CA_FONT COLOR tag allows specifying a color of text that is automatically highlighted by the automatic document processing mechanism of the preferred embodiments. The term RRGGBB is a six digit hexadecimal number with the first two digits specifying the red value, the middle two the green value, and the last two the blue value. Instead of specifying a six digit hexadecimal number, one can also specify a color name for the highlighted text color. Valid colors in this specific example are aqua, black, blue, fuchsia, gray, green lime, maroon, navy, olive, purple, red, silver, teal, yellow, and white. If the text to be highlighted is already in the specified color, the display mechanism could display the entire document in black and white, with the only colors present in the document being colors relating to automatic highlighting. Another way to handle if text to be highlighted is already in the specified color is to use an alternative form of highlighting, such as increased font size, underline, etc.

FIG. 15 shows a tag CA_FONT SIZE that allows specifying the font size of text that is automatically highlighted. A tag CA_FONT FACE allows specifying the font style of text that is automatically highlighted. Note that the CA_FONT FACE tag allows specifying multiple fonts. For example, multiple fonts may be specified in the tag, and the first font in the list that is installed on the client machine will be used. If the text to be highlighted is already in the specified font size or style, some alternative form of highlighting could be performed instead.

The remaining tags in FIG. 15 have both beginning and end tags (similar to many existing HTML tags) and are thus used to identify portions of the electronic document that can be handled differently based on the user preferences for automatic highlighting. The end tag is the same as the beginning tag, except it has a slash "/" before the beginning tag. The CA_OPINION tag allows an author to identify portions of the document where the author voices an opinion. The CA_SUMMARY tag allows an author to identify portions of the document that provide a summary. The CA_CONCLUSION tag allows an author to identify portions of the document that provide conclusions. The CA_COUNTER-POINT tag allows an author to identify portions of the document that provide counter-points. The CA_IMAGE INCLUDE tag is used to identify one or more images that should be included when automatic highlighting is being performed. There may be an image that is crucial to the reader's understanding, so it is surrounded by the CA_IMAGE INCLUDE beginning and ending tags. The CA_IMAGE EXCLUDE tag is used to identify one or more images that should be excluded when automatic highlighting is being performed. Images that provide details that the reader may not need to consider on initial perusal can thus be excluded so they are not included in the document the user initially views.

The identifying of images to include and exclude may be used by the automatic highlight enable/disable adjustment mechanism 610 of FIG. 6 to change how an electronic document is presented based on the user's actions. Thus, when the user is quickly scrolling through a document, all images except those specified by CA_IMAGE INCLUDE tags could be omitted. Once the user stops scrolling, it is presumed that the user is now reading the text. At this time, other images could be loaded to present more detail to the reader based on the reader having stopped the scrolling to read the document.

The preferred embodiments also includes the capability of setting up different profiles for automatically highlighting documents. These profiles are a saved set of user preferences that the user can select from a list. For example, a "technical paper" profile could be created that is tuned to reading technical papers and articles. A "young child" profile could be created that provides more dramatic highlighting to young children, and includes all images. Other profiles could be defined according to the user's needs. In the preferred embodiment, a profile is defined by saving a set of user preferences with a selected profile name. The profile name is then added to a list of profiles that the user may choose that govern how a document is automatically highlighted.

The preferred embodiments display an electronic document to a user with one or more highlighted portions according to user-defined preferences for automatic highlighting. Preferences may include words or phrases to highlight, how the highlighting is to be performed (e.g., bold, underline, font size, font color, background color, etc.), whether or not stem processing of specified words/phrases is performed, etc. In addition, the preferred embodiments allow automatically turning on and off the automatic highlighting of an electronic document based on the user's actions in browsing the document. Tags are also defined that allow an author of an electronic document to specifically identify certain portions of the document, and to govern how text is highlighted in the preferred embodiments.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   an electronic document residing in the memory; and
   an automatic document processing mechanism residing in the memory and executed by the at least one processor, the automatic document processing mechanism processing the electronic document and automatically producing selective highlighting for at least a portion of the electronic document to enhance the comprehension of the electronic document by a human reader, the automatic document processing mechanism determining which portions of the electronic document to selectively highlight based on user preferences, the user preferences including a specification of at least one word in the electronic document that triggers highlighting of a corresponding portion of the electronic document, the automatic document processing mechanism automatically enabling, disabling and adjusting the selective highlighting according to actions of the human reader in browsing the electronic document when the electronic document is displayed, wherein the actions of the human reader include scrolling through the electronic document, and wherein the automatic selective highlighting may be enabled, disabled and adjusted according to speed of the user scrolling through the electronic document.

2. The apparatus of claim 1 wherein the user preferences further include a specification of type of highlighting.

3. The apparatus of claim 1 wherein the user preferences comprise a saved profile that defines how to selectively highlight the electronic document.

4. The apparatus of claim 1 further comprising a display mechanism that displays the selective highlighting in a display of the electronic document.

5. The apparatus of claim 1 further comprising a conversion mechanism that generates a new electronic document that includes the selective highlighting.

6. The apparatus of claim 1 further comprising at least one markup language tag in the electronic document that specifies to the automatic document processing mechanism how to perform at least a portion of the selective highlighting of the electronic document.

7. The apparatus of claim 1 wherein a manner of performing the selective highlighting is selected from the group consisting of: bold, italics, underline, double underline, font style, font size, font color, and background color.

8. The apparatus of claim 1 further comprising a mechanism for automatically enabling, disabling and adjusting the selective highlighting according to characteristics of the electronic document.

9. An apparatus comprising:
   at least one processor;
   a memory coupled to the at least one processor;
   an electronic document residing in the memory;
   an automatic document processing mechanism residing in the memory and executed by the at least one processor, the automatic document processing mechanism processing the electronic document and automatically producing selective highlighting for at least a portion of the electronic document to enhance the comprehension of the electronic document by a human reader, the automatic document processing mechanism determining which portions of the electronic document to selectively highlight based on user preferences that include a specification of at least one word in the electronic document that triggers highlighting of a corresponding portion of the electronic document, the automatic document processing mechanism including:

a display mechanism that displays the selective highlighting in a display of the electronic document;

a conversion mechanism that generates a new electronic document that includes the selective highlighting; and a mechanism for automatically enabling, disabling and adjusting the selective highlighting according to actions of the human reader in browsing the electronic document when the electronic document is displayed, wherein the actions of the human reader include scrolling through the electronic document, and wherein the automatic selective highlighting may be enabled, disabled and adjusted according to speed of the user scrolling through the electronic document.

10. The apparatus of claim 9 wherein the user preferences comprise a saved profile that defines how to selectively highlight the electronic document.

11. The apparatus of claim 9 further comprising at least one markup language tag in the electronic document that specifies to the automatic document processing mechanism how to perform at least a portion of the selective highlighting of the electronic document.

12. The apparatus of claim 9 wherein a manner of performing the selective highlighting is selected from the group consisting of: bold, italics, underline, double underline, font style, font size, font color, and background color.

13. The apparatus of claim 9 further comprising a mechanism for automatically enabling, disabling and adjusting the selective highlighting according to characteristics of the electronic document.

14. A method for selectively highlighting an electronic document, the method comprising the steps of:

(A) determining user preferences for selectively highlighting the electronic document, the user preferences including a specification of at least one word in the electronic document that triggers highlighting of a corresponding portion of the electronic document;

(B) reading the electronic document;

(C) processing the electronic document according to the user preferences;

(D) selectively highlighting at least a portion of the electronic document according to the user preferences; and (E) automatically enabling and disabling the selective highlighting according to actions of the human reader in browsing the electronic document when the electronic document is displayed, wherein the actions of the human reader include scrolling through the electronic document, and wherein the automatic selective highlighting may be enabled and disabled according to speed of the user scrolling through the electronic document.

15. The method of claim 14 wherein the user preferences further include a specification of type of highlighting.

16. The method of claim 14 wherein the user preferences comprise a saved profile that defines how to selectively highlight the electronic document.

17. The method of claim 14 further comprising the step of displaying the electronic document with the selective highlighting to a human reader.

18. The method of claim 14 further comprising the step of generating a new electronic document that includes the selective highlighting.

19. The method of claim 14 wherein the electronic document comprises at least one markup language tag that specifies to the automatic document processing mechanism how to selectively highlight at least a portion of the electronic document.

20. The method of claim 14 wherein a manner of performing the selective highlighting is selected from the group consisting of: bold, italics, underline, double underline, font style, font size, font color, and background color.

21. The method of claim 14 further comprising the step of automatically enabling and disabling the selective highlighting according to actions of the human reader in browsing the electronic document when the electronic document is displayed.

22. The method of claim 14 further comprising the step of automatically enabling and disabling the selective highlighting according to characteristics of the electronic document.

23. A method for selectively highlighting an electronic document to aid a human reader in comprehending the electronic document, the method comprising the steps of:

(A) determining user preferences for selectively highlighting the electronic document, the user preferences including a specification of at least one word in the electronic document that triggers highlighting of a corresponding portion of the electronic document, the user preferences further including a specification of type of highlighting;

(B) reading the electronic document;

(C) processing the electronic document according to the user preferences; and (D) selectively highlighting at least a portion of the electronic document according to the user preferences;

(E) displaying the electronic document with the selective highlighting to the human reader; and (F) automatically enabling, disabling and adjusting the selective highlighting according to actions of the human reader in browsing the electronic document when the electronic document is displayed, wherein the actions of the human reader include scrolling through the electronic document, and wherein the automatic selective highlighting may be enabled, disabled and adjusted according to speed of the user scrolling through the electronic document.

24. The method of claim 23 wherein the user preferences comprise a saved profile that defines how to selectively highlight the electronic document.

25. The method of claim 23 further comprising the step of generating a new electronic document that includes the selective highlighting.

26. The method of claim 23 wherein the electronic document comprises at least one markup language tag that specifies to the automatic document processing mechanism how to selectively highlight at least a portion of the electronic document.

27. The method of claim 23 wherein a manner of performing the selective highlighting in step (D) is selected from the group consisting of: bold, italics, underline, double underline, font style, font size, font color, and background color.

28. The method of claim 23 further comprising the step of automatically enabling, disabling and adjusting the selective highlighting according to characteristics of the electronic document.

29. A computer-readable program product comprising:
(A) an automatic document processing mechanism that processes an electronic document and automatically produces selective highlighting for at least a portion of the electronic document to enhance the comprehension of the electronic document by a human reader, the automatic document processing mechanism determining which portions of the electronic document to selectively highlight based on user preferences that include a specification of at least one word in the electronic document that triggers highlighting of a corresponding portion of the electronic document, the automatic document processing mechanism automatically enabling, disabling and adjusting the selective highlighting according to actions of the human reader in browsing the electronic document when the electronic document is displayed, wherein the actions of the human reader include scrolling through the electronic document, and wherein the automatic selective highlighting may be enabled, disabled and adjusted according to speed of the user scrolling through the electronic document; and
(B) recordable media bearing the automatic document processing mechanism.

30. The program product of claim 29 wherein the user preferences further include a specification of type of highlighting.

31. The program product of claim 29 wherein the user preferences comprise a saved profile that defines how to selectively highlight the electronic document.

32. The program product of claim 29 further comprising a display mechanism that displays the selective highlighting in a display of the electronic document.

33. The program product of claim 29 further comprising a conversion mechanism that generates a new electronic document that includes the selective highlighting.

34. The program product of claim 29 further comprising at least one markup language tag in the electronic document that specifies to the automatic document processing mechanism how to perform at least a portion of the selective highlighting of the electronic document.

35. The program product of claim 29 wherein a manner of performing the selective highlighting is selected from the group consisting of: bold, italics, underline, double underline, font style, font size, font color, and background color.

36. The program product of claim 29 further comprising a mechanism for automatically enabling, disabling and adjusting the selective highlighting according to characteristics of the electronic document.

37. A computer-readable program product comprising:
(A) an automatic document processing mechanism that processes the electronic document and automatically produces selective highlighting for at least a portion of the electronic document to enhance the comprehension of the electronic document by a human reader, the automatic document processing mechanism determining which portions of the electronic document to selectively highlight based on user preferences that include a specification of at least one word in the electronic document that triggers highlighting of a corresponding portion of the electronic document, the automatic document processing mechanism including:
   (A1) a display mechanism that displays the selective highlighting in a display of the electronic document; and
   (A2) a conversion mechanism that generates a new electronic document that includes the selective highlighting;
   (A3) a mechanism for automatically enabling, disabling and adjusting the selective highlighting according to actions of the human reader in browsing the electronic document when the electronic document is displayed, wherein the actions of the human reader include scrolling through the electronic document, and wherein the automatic selective highlighting may be enabled, disabled and adjusted according to speed of the user scrolling through the electronic document; and
(B) recordable media bearing the automatic document processing mechanism.

38. The program product of claim 37 wherein the user preferences comprise a saved profile that defines how to selectively highlight the electronic document.

39. The program product of claim 37 further comprising a mechanism for automatically enabling, disabling and adjusting the selective highlighting according to characteristics of the electronic document.

* * * * *